Figure 1:
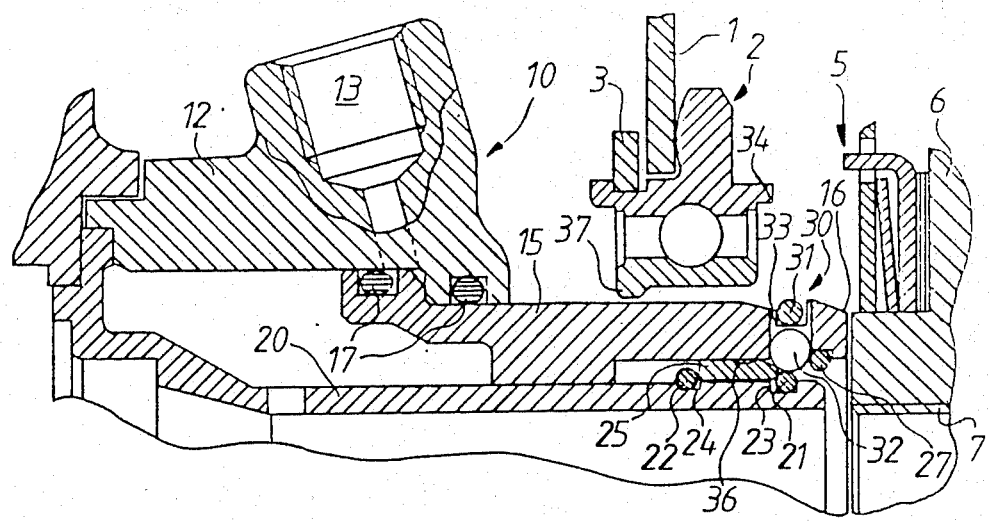

United States Patent [19]

Eliasson

[11] Patent Number: 4,778,039

[45] Date of Patent: Oct. 18, 1988

[54] FRICTION CLUTCH HAVING PREMOUNTED RELEASE BEARING AND PREMOUNTED RELEASE MECHANISM

[75] Inventor: Thomas Eliasson, Stockholm, Sweden

[73] Assignee: Saab-Scania Aktiebolag, Sodertalje, Sweden

[21] Appl. No.: 45,854

[22] PCT Filed: Aug. 29, 1986

[86] PCT No.: PCT/SE86/00383

§ 371 Date: Apr. 23, 1987

§ 102(e) Date: Apr. 23, 1987

[87] PCT Pub. No.: WO87/01773

PCT Pub. Date: Mar. 26, 1987

[30] Foreign Application Priority Data

Sep. 11, 1985 [SE] Sweden .............................. 8504198

[51] Int. Cl.[4] ...................... F16D 13/22; F16D 23/14
[52] U.S. Cl. ............................ 192/85 CA; 192/70.13; 192/91 A; 192/98; 192/DIG. 1
[58] Field of Search ............. 192/70.13, 85 CA, 91 A, 192/98, 110 B, DIG. 1

[56] References Cited

U.S. PATENT DOCUMENTS 4,687,084  8/1987  Leigh-Monstevens et al. ...... 192/85 CA
4,691,814  9/1987  Wimbush ........................ 192/91 A

FOREIGN PATENT DOCUMENTS 0044691  1/1982  European Pat. Off. .
2944648  5/1981  Fed. Rep. of Germany .
3044048  7/1982  Fed. Rep. of Germany .
2046864  11/1980  United Kingdom .................. 192/98
2098697  11/1982  United Kingdom ............. 192/91 A Primary Examiner—Rodney H. Bonck
Assistant Examiner—Richard M. Lorence
Attorney, Agent, or Firm—Cushman, Darby & Cushman

[57] ABSTRACT

In a friction clutch between an engine and a gearbox, a clutch release bearing is premounted in a clutch portion connected to the engine and an axially displaceable sleeve piston cooperating with the clutch release bearing is premounted in a release mechanism connected to the gearbox. The sleeve piston comprises a companion flange assembly which cooperates with a blocking element to assume a position for either displacing or not displacing the clutch release bearing. Such an arrangement is used in a so-called pull type clutch, which requires connection between the clutch release bearing and the release mechanism when the engine is connected to the gearbox. The present invention permits simple and secure assembly and disassembly of the engine to the gearbox and the clutch release bearing to the release mechanism. This is made possible primarily by the fact that the blocking element, when the clutch is assembled, has a position relative to the sleeve piston in which the companion flange assembly is actively pressed by the blocking element to a position for displacing the clutch release bearing.

6 Claims, 2 Drawing Sheets

FRICTION CLUTCH HAVING PREMOUNTED RELEASE BEARING AND PREMOUNTED RELEASE MECHANISM

The present invention relates to an arrangement in a friction clutch between an engine and a gearbox, wherein a clutch release bearing is premounted in a clutch part connected to the engine and an axially displaceable sleeve cooperating with the clutch release bearing is premounted in a release mechanism connected to the gearbox, said sleeve comprising a companion flange means cooperating with a blocking element to assume a position for either displacing or not displacing the clutch release bearing.

This type of arrangement is used in so-called pull clutches, which when used in the drive unit of a motor vehicle have advantages as regards function, functional life and cost of manufacture over so-called press clutches. The latter have the advantage however of simple mounting when connecting the engine and the gearbox, since the release mechanism only needs to press on the clutch release bearing.

In a pull clutch the clutch release bearing and the release mechanism must be linked together however. Since it is difficult when connecting the engine and the gearbox to get at the clutch release bearing and the release mechanism from the outside, it is desirable that the connection and disconnection be effected automatically.

It is known by German Offenlegungsschrift 3 113 463 to carry out such automatic connections. These solutions use companion flange means in the form of a ring spring which is biassed toward a position for displacing the clutch release bearing. The solutions require that when connecting or disconnecting an engine and a gearbox, a sufficiently large force is applied to force the spring into or out of the displacing position. This involves a further complication of an already relatively complicated assembly and disassembly process. Misalignment between the engine and the gearbox can be the result as well as clamping of the spring ring with increased risk of spring breakage. If the spring should break, the biassing towards the displacing position also ceases, and the clutch will be inoperative.

The purpose of the present invention is to achieve an arrangement of the type initially described which does not have the above mentioned disadvantages. Rather it provides for simple assembly and disassembly of the engine and gearbox with secure linkage between the clutch release bearing and the release mechanism as a result. For this purpose the invention is characterized in that the blocking element in a clutch-assembled position has a position relative to the sleeve in which the companion flange means is actively acted on by the blocking element to a clutch release bearing displacing position.

Through the solution according to the invention, the companion flange means is acted on directly by the blocking element to assume a displacing position, and therefore the companion flange means does not need to be biassed towards said position. This makes it also possible to link together the clutch release bearing and the release mechanism by acting on the blocking element without having to make the force applied when connecting the engine and gearbox overcome the spring force.

In an advantageous embodiment of the invention, the sleeve is located radially inside the clutch release bearing and constitutes a portion of the piston in a hydraulic cylinder. This makes the hydraulically operated clutch compact by enabling the space between the clutch portion fixed to the engine and the cylinder housing of the release mechanism to be used to axial displacement of the clutch release bearing.

In a further advantageous embodiment of the invention the companion flange means is spring-loaded towards a position for not displacing the clutch release bearing and is arranged by the action of the blocking element to be brought to the displacing position when the sleeve is imparted a release movement starting from an assembly end position. To overcome the pretension of the companion flange means, the releasing power is used which is generated when operating the release mechanism. Therefore the force for connecting the engine and the gearbox is not affected by this bias. The interaction between the blocking element and the companion flange means is thus without play in the displacing position and a smooth return to the non-displacing position is also facilitated when disconnecting the engine and the gearbox.

Figure 2:
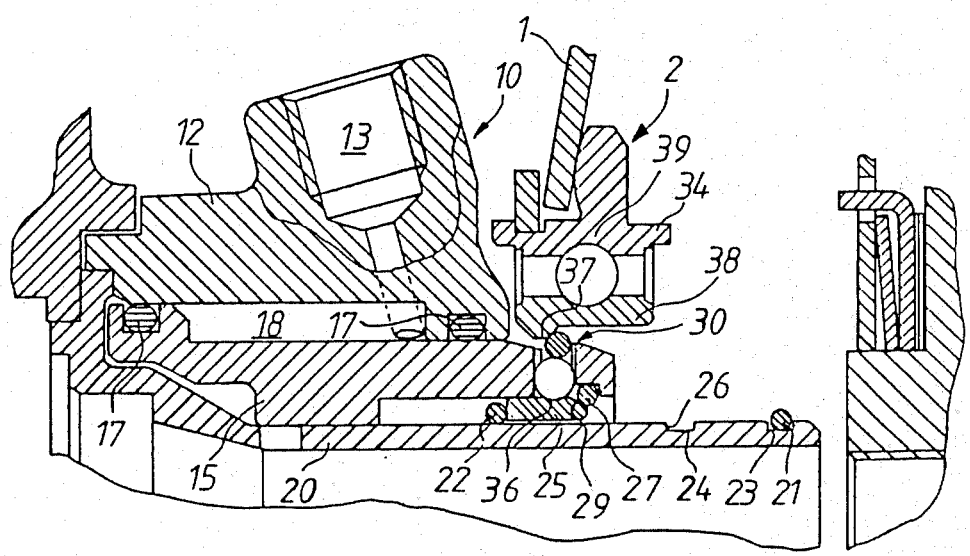
Figure 3:
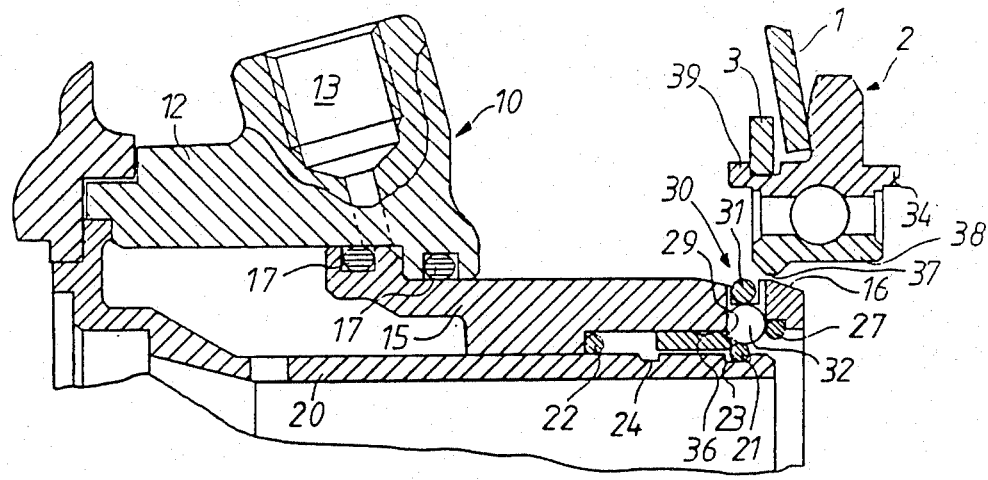
Figure 4:
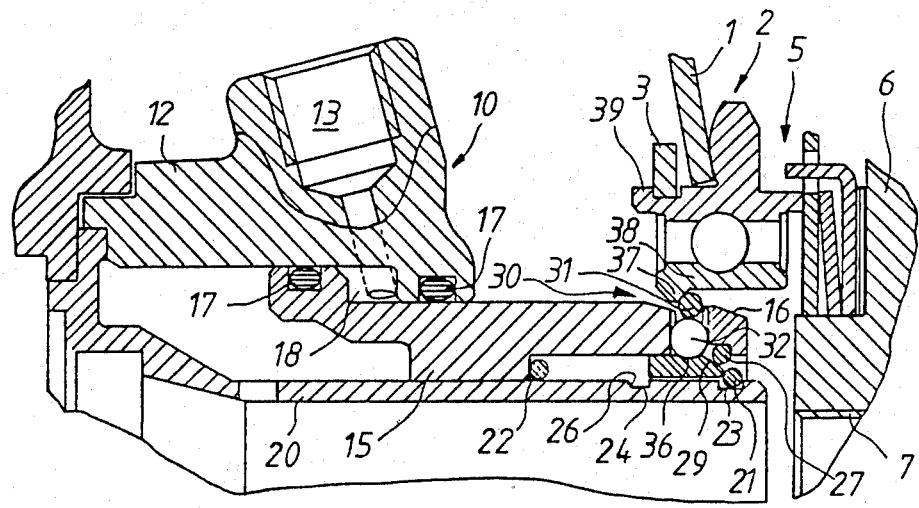

Other characteristic features of the invention will be evident from the accompanying claims and the description below of an embodiment exemplifying the invention. The description is with reference to the accompanying drawings of which:

FIG. 1 shows a longtiudinal section of the inventive arrangement in the assembly position, FIG. 2 shows a corresponding section with the clutch fully released, FIG. 3 shows a section in the disassembly position, and FIG. 4 shows a section with the clutch engaged with worn discs.

The arrangement shown in the Figures relates to a hydraulically operative pull-type friction clutch between an engine and a gearbox in a vehicle drive unit. Of the portion of the clutch, which is non-rotatably joined to the engine crankshaft, the Figures show the inner portion of a diaphragm spring 1, which engages a clutch release bearing 2, mounted on the spring with the aid of a lock ring 3.

The portion of the friction clutch, which is non-rotatably joined to the input shaft (not shown) of the gearbox, consists of a disc 5 of which the Figures show its hub portion 6, which is joined via inner splines 7 to the gearbox shaft (not shown). The disc 5 has the usual frictional linings which when the clutch is not activated are pressed by springs against the engine fly wheel to transmit torque between the engine crankshaft and the gearbox shaft.

The clutch is operated with a release mechanism 10, which is fixed relative to the gearbox housing (not shown). The mechanism 10 comprises a hydraulic piston cylinder unit in which the cylinder comprises a cylinder housing 12 with a connection 13 for hydraulic fluid and an annular piston means in the form of an axially displaceable sleeve 15, hereinafter called piston sleeve. Between the piston sleeve 15 and the cylinder housing 12, O-rings 17 seal off an annular closed space 18, which during release, for example by the driver depressing the clutch pedal, is filled with fluid so that the piston sleeve 15 is pushed away from the disc 5 towards a rear release position. When the driver lets off the pedal to engage the clutch, the piston sleeve 15 is pressed back to a forward engaged position. In the following the terms forward, rear and the like are used in relation to the position of the disc. During the stroke movment, the piston sleeve 15 slides on a supporting tube 20 lying radially inside it, which is fixed relative to the gearbox housing (not shown).

The piston sleeve 15 has at its forward end a companion flange means consisting of a wire ring 31 and a number of rolling means 32. The wire ring 31 is biassed towards an inner radial position in a groove 33. The rolling means 32 are preferably balls, which can be moved in radial holes extending through the piston sleeve 15, whereby the balls can come into contact with the radial inside of the wire ring 31.

On the radial inside of the piston sleeve 15, the balls 32 cooperate with a blocking element 25 in the form of a sleeve, hereinafter called the blocking sleeve, located between the piston sleeve 15 and the supporting tube 20. The blocking sleeve 25 is slidably mounted on the inner surface of the piston sleeve 15 but has a clearance relative to the supporting tube 20. The blocking sleeve 25 is also located between a forward and a rear stop means 21 and 22, respectively, fixed to the supporting tube 20. Both of the stop means 21,22 consist of wire rings which are resiliently snapped into grooves 23,24. The groove 24 has an oblique rear flank 26, however. The rear wire ring 22 is therefore a flexible stop means, the stopping capacity of the same ceasing when a sufficiently great rearwardly directed axial force is applied to it. The forward wire ring 21 is, on the other hand, a nonflexible fixed stop means. As an additional fixed stop means interacting with the blocking sleeve 25 there is a third wire ring 27 snapped into a groove in the piston sleeve 15 immediately in front of the companion flange means 30.

The forward end of the blocking sleeve 25 is made with a radially outwardly directed inclined flank 29, which during assembly and disassembly interacts with the balls 32 to facilitate moving the companion flange means between displacement and non-displacement positions. In the displacement position, the balls 32 rest against a radial recess 36 in the outer surface of the blocking sleeve 25. In this position, the wire ring 31 also cooperates with an inclined forward flank on a shoulder 37 formed on the radially inner bearing ring 38 of the clutch release bearing. The shoulder 37 also has a rear flank, which together with an inclined surface 16 on the front end of the piston sleeve 15 facilitates the mounting of the clutch release bearing 2 on the piston sleeve 15.

The outer bearing ring 39 of the clutch release bearing is provided with an axially directed shoulder 34, which when the disc is worn (not shown) limits the maximum possible return position for the clutch release bearing 2 to the position shown in FIG. 4, where the shoulder 34 comes into contact with the hub 6 of the disc. This position is so adjusted that the forward end of the blocking sleeve 25 then abuts the forward stop means 21.

The arrangement according to the invention functions as follows. Before the engine and the gearbox are to be connected, the release mechanism 10 is premounted on the gearbox, and the rest of the clutch parts, including the disc 5, the diaphragm spring 1 and the clutch release bearing 2 mounted thereon, are premounted on the engine and its flywheel. The piston sleeve 15 is advanced to a forward assembly position as shown in FIG. 1, in which the companion flange means 30 assumes a retracted position. The blocking sleeve 25 is also premounted in an assembly position between the wire rings 21,22 located in the grooves 23 and 24, respectively.

When connecting the engine and the gearbox, the input shaft (not shown) of the gearbox is fitted to the inner splines 7 of the disc 5 at the same time as the clutch release bearing 2 is slipped onto the piston sleeve 15 without being stopped by the companion flange means 30. When the engine and the gearbox are completely connected, the release mechanism 10 is actuated manually, suitably by depressing the vehicle clutch pedal, whereby fluid is applied to the space 18. The piston sleeve 15 is then displaced backwards, but the blocking sleeve 25 is prevented by the stop means 22 from accompanying it in its rearward movement. The balls 32 thus roll up onto the flank 29 of the blocking sleeve 25 and press the wire ring 31 to a radially outer position. The balls 32 enter the recess 36 in the blocking sleeve 25, and this happens before or at the same time as the wire ring 27 abuts against the flank 29 of the blocking sleeve 25. When the force on the piston sleeve 1 increases still more, the level is reached where the blocking sleeve 25, through the action of the wire ring 27, can press the wire ring 22 out of the groove 24. By varying the angle of the rear flank of the groove 24, a suitable level of force can be achieved for the flexibility of the stop means 22. Continued movement backwards of the piston sleeve 15 brings with it the wire ring 22 to a clutch release position shown in FIG. 2. During this movement, the companion flange wire ring 31 has also come into contact with the shoulder 37 of the clutch release bearing 2, and thus the movement of the piston sleeve 15 is transmitted to the clutch release bearing 2 for breaking the power transmission between the engine and the gearbox.

Through the above described first actuation of the release mechanism 10 there thus occurs an automatic desired interengagement of said mechanism and the clutch release bearing 2 and thereby to the other clutch parts connected to the engine.

When disconnecting the engine and the gearbox, the clutch release bearing 2 actuates via the companion flange means 30 the clutch sleeve 15 so that it is displaced by the disengagement force to the forward end position shown in FIG. 3. This position is identical to the assembly position shown in FIG. 1. Before the end position is reached, the blocking sleeve 25 has been stopped by the wire ring 21 and continued forward movement of the piston sleeve 15 pushes the balls 32 of the companion flange means 30 out of the recess 36 in the blocking sleeve 25 and downwards along its flank 29. In the end position, the companion flange means 30 has assumed a retracted position and the clutch release bearing 2 can be freely removed from the release mechanism.

During operation, the piston sleeve 15 performs a disengagement and engagement movement which usually uses less than half of the maximum possible stroke length of the piston sleeve. With new friction linings on the disc 5, the piston sleeve 15 works between a release position shown in FIG. 2 and a forward engaged position which can be represented by the position of the clutch release bearing 2 in FIG. 1. As the linings are worn down, the engagement and disengagement movement of the piston sleeve 15 is moved forward however. With worn down linings, the piston sleeve has an engagement position as shown in FIG. 4. The shoulder 34 on the clutch release bearing 2 has then come into abutment against the hub portion 6 of the disc 5. This eliminates the risk of excessive wear on the linings which can result in damage to the pressure plate and the flywheel. At the same time, the interaction in said position of the blocking sleeve 25 with the wire rings 22,27 and the companion flange means 30, as well as the interaction of the latter with the clutch release bearing 2, is adjusted so that there is no risk that the companion flange means 30 will assume a retracted non-engaging position. The axial space requirements of the arrangement are suitably limited by the blocking sleeve 25 abutting in this position against the wire ring 21 in the supporting tube 20. To eliminate the risk of the piston sleeve 15 being displaced to the end position in FIG. 3 by inertial forces accompanying rapid engagement movements, a certain overpressure is always maintained in the space 18 with the aid of a non-return valve (not shown) in the hydraulic system of the release mechanism 10.

The example described above in no way limits the invention. Rather it can be varied in numerous embodiments within the scope of the following patent claims. The release mechanism can for example be of mechanical type and the companion flange means and the blocking element can also be modified in many ways without deviating from the inventive concept.

I claim:

1. In a friction clutch to be connected between an engine and a gearbox, wherein a clutch release bearing is premountedin a clutch part connectable to the engine and an axial sleeve displaceable between a forward end postiion and a rearward end position, said sleeve cooperating with the clutch release bearing is premounted in a release mechanism connectable to the gearbox, said sleeve comprising a companion flange means cooperating with a blocking element to assume a first position for displacing the clutch release bearing and a second position for not displacing the clutch release bearing, said companion flange means being spring-loaded towards the blocking element, which in a clutch-assembled position assumes a position in which it keeps the companion flange means locked in a position for axially displacing the clutch release bearing, said clutch being characterized in that the companion flange means is radially displaceable in a groove in the sleeve, and that the blocking element is located radially between the sleeve and a supporting tube, which can be fixed relative to the gearbox, and axially between first and second stop means carried by the supporting tube, so that when assembling and disassembling the clutch the sleeve becomes displaced from and to, respectively, said forward end position, the blocking element and either of the stop means cooperating with each other such that a relative axial movement between the blocking element and the sleeve is obtained, the result being that, when assembling and disassembling the clutch the blocking element forces the companion flange means and the sleeve to, respectively, said retracted position and said extended position.

2. A clutch as in claim 1 wherein the companion flange means includes a radially expandable ring and rolling bodies or the like, which are radially displaceable in the sleeve by the blocking element so as to expand the ring to effect power transmission between the ring and the blocking element.

3. A clutch as in claim 1 wherein the sleeve is disposed radially inside the clutch release bearing and constitutes a portion of a sleeve piston in a hydraulic release mechanism.

4. A clutch as in claim 3 wherein the blocking element is an annular sleeve, and wherein between the companion flange means and an end of the sleeve piston there is disposed a third stop means, fixed to the sleeve piston for stopping the blocking sleeve, said third stop means, in the engaged position of the clutch being disposed closer to said sleeve piston end than to the blocking sleeve.

5. A clutch as in claim 4 wherein said first stop means includes a resilient ring which in an assembly position is carried in a groove in the supporting tube, whereby the stopping action of the resilient ring ceases at an axial force exceeding the force generated when the blocking sleeve presses the companion flange means to a position for displacing the clutch release bearing.

6. A clutch as in claim 5 wherein the clutch release bearing includes a radially outer rotating bearing ring which is provided with an axial shoulder, which when the clutch is assembled, determines the end position of the sleeve piston essentially to a position where the blocking sleeve abuts against said second stop means, which is fixed to the supporting tube

* * * * *